April 18, 1933. E. B. NOWOSIELSKI 1,904,745

YIELDING COUPLING

Filed Nov. 21, 1929

Inventor
Edward B. Nowosielski,
By
Cameron, Kirkam & Sutton
Attorneys

Patented Apr. 18, 1933

1,904,745

UNITED STATES PATENT OFFICE

EDWARD B. NOWOSIELSKI, OF BLOOMFIELD, NEW JERSEY, ASSIGNOR TO ECLIPSE AVIATION CORPORATION, OF EAST ORANGE, NEW JERSEY, A CORPORATION OF NEW JERSEY

YIELDING COUPLING

Application filed November 21, 1929. Serial No. 408,902.

This invention relates to a yielding rotary shaft coupling, and more particularly to a coupling of this general type which is embodied in the drive for an electric generator.

One of the objects of the present invention is to provide a novel yielding rotary shaft coupling which is adapted to transmit driving torque without excessive shocks or strains, and one which is particularly adapted for long life under severe operating conditions.

Another object is to provide such a device which is noiseless in operation, and which requires no lubrication.

A further object of the invention is the provision of a novel yielding rotary shaft coupling in which relative motion between the driving and driven members is resisted by compressible elastic elements and which is so constructed as to closely limit the relative angular displacement between the driving and driven members to a predetermined amount.

A still further object is to provide a novel coupling particularly adapted for use with the armature shaft of an electric generator, the coupling being so constructed that driving torque may be suddenly transmitted to said shaft without imposing excessive stresses on the shaft.

Further objects and advantages will be apparent to those skilled in the art from the following description taken in connection with the accompanying drawing in which.

Figure 1:
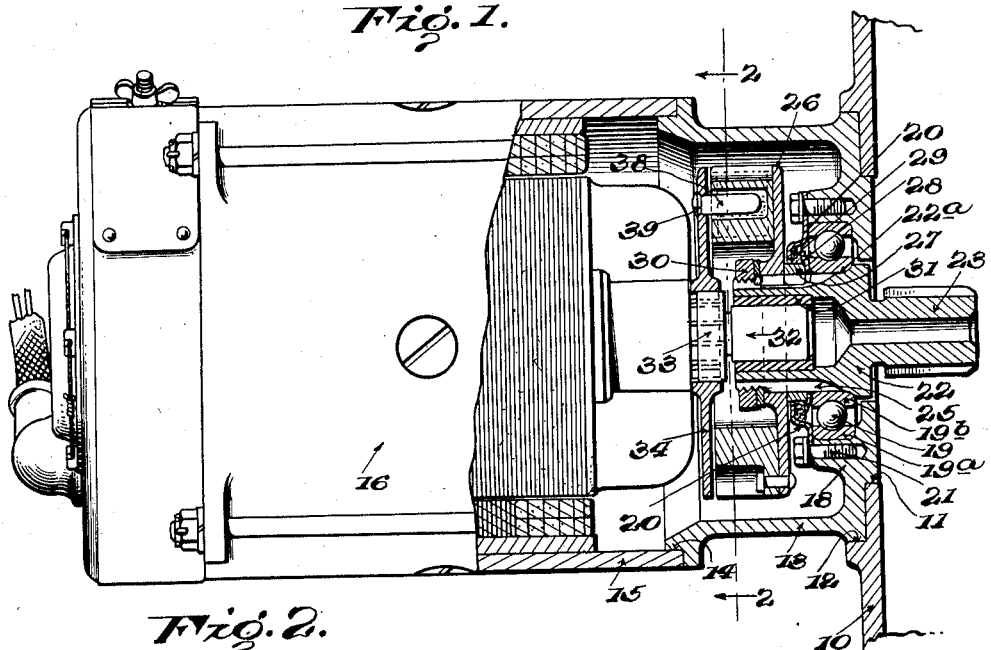
Fig. 1 is a side elevation, partly in section, of a generator drive embodying the present invention.

In Fig. 1 a portion of an engine casing 10 is shown having an opening 11 therein which is suitably shouldered and faced as indicated generally at 12, for the reception of a cylindrical casing member 13 which is adapted to be rigidly mounted therein in any suitable manner. Casing member 13 is provided with an annular seat 14 which is adapted to form the mount for the frame 15 of a generator 16 of any suitable type, the frame 15 being attached to casing member 13 in any suitable way as by means of screws or bolts 17.

Casing 13 is provided with an internal annular shoulder 18 adapted to form a seat for an antifriction bearing 19 the outer race 19a of which is suitably clamped therein as by means of an annular gland member 20 fixed to said shoulder by screws 21. A driving shaft 22 is provided with a shouldered seat 22a adapted to fit closely within the inner race 19b of said bearing 19, and extends within the engine casing where it is provided with a pinion 23 integrally formed therewith, or suitably mounted thereon, which is adapted for driving engagement with a suitable member of the engine.

The opposite end of shaft member 22 is splined as indicated at 25, and a correspondingly splined and disc-shaped driving coupling member 26 is mounted thereon to rotate therewith. A spacing ring 27 and an oil guard 28 are interposed between the driving coupling member 26 and the bearing 19, and cooperate with a ring of packing material 29 to retain the lubricant applied to bearing 19. Suitable means such as a nut 30 threaded on the end of shaft 22 and a lock washer are provided for retaining the members in assembled position upon shaft 22.

The splined end of shaft 22 is bored to receive a bearing sleeve 31 of any suitable type, and the armature shaft 32 of generator 16 is adapted to be rotatably mounted within said sleeve whereby the driving shaft 22 forms a rotatable support for one end of the armature shaft. Armature shaft 32 is shouldered and splined as indicated at 33, and a driven coupling member 34 is mounted thereon in spaced relation to the driving coupling member 26.

Figure 2:
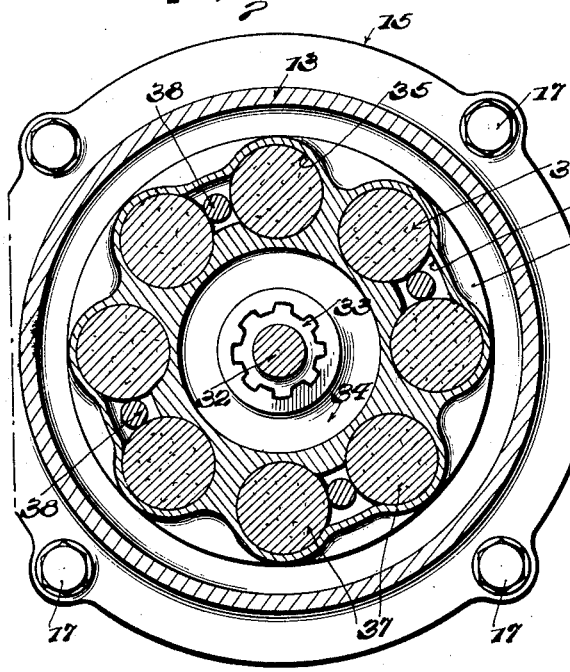
Fig. 2 is a vertical section taken substantially on the line 2—2 of Fig. 1.
Figure 3:
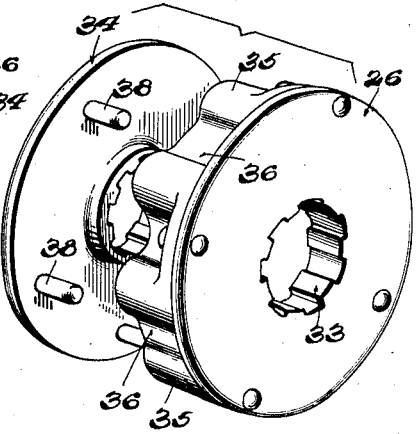
Fig. 3 is a detail view in perspective of the driving and driven coupling members.

Driving coupling member 26, as shown more particularly in Figs. 2 and 3 of the drawing, is provided with a circular series of pairs of cylindrical recesses 35, each pair of recesses being connected by passages 36. Transmitting elements in the form of cylindrical blocks 37 of suitable resilient material such as rubber, are mounted within the recesses 35 and are preferably adapted to completely fill said recesses so that the blocks are rigidly supported and can expand only in one direction. Cooperating transmitting elements in the form of cylindrical pins 38 are rigidly mounted in the driven member 34 in any suitable way, as by being riveted therein as indicated at 39, and are adapted to extend toward the driving member 26 and within the passages 36 in firm contact on each side with one of a corresponding pair of elastic transmitting elements 37.

In operation, rotation of the driving shaft 22 rotates driving coupling member 26 and the elastic transmitting elements 37. The driven coupling member 34 is yieldably driven by reason of the engagement of the pins 38 thereon between the elastic transmitting elements 37, thus causing the armature shaft 32 to be yieldingly rotated.

It will be noted that by reason of the almost complete enclosing of the elastic transmitting elements 37, the relative rotation between the driving and driven coupling members may be restricted to any suitably small angle, even though the transmitting elements 37 may be formed of comparatively soft material.

It is thus possible to form the transmitting elements 37 of material such that the pins 38 of the driven member will partially embed themselves therein and the force transmitted will be distributed generally throughout the transmitting elements 37 instead of being localized near the pins 38 and the points opposite thereto. This arrangement is conducive to an extremely long life for the coupling, and corresponding retention of its original elasticity. The splined relation between the driven coupling member 34 and the armature shaft 32 allows the armature to float longitudinally and center itself magnetically with respect to the field of the generator, in spite of the close frictional engagement of the driving and driven transmitting elements.

It will be noted that the coupling is adapted to transmit torque in either direction, and when acting in one direction only one elastic element 37 of each pair transmits the torque to pins 38, the remaining elements 37 being effective to prevent back-lash.

Although but one embodiment of the invention has been shown and described in detail, it is to be expressly understood that the illustrated embodiment is not exclusive, and various other embodiments will now suggest themselves to those skilled in the art, while changes may be made in the construction, arrangement and proportions of parts, and certain features used without other features, without departing from the spirit of the invention. For example, the position of the elements 26 and 34 may be reversed so that element 34 constitutes the driving member. Reference is therefore to be had to the claims hereto appended for a definition of the limits of the invention.

What is claimed is:

1. A yielding coupling comprising a disk having a plurality of elements extending from the lateral face thereof and rotatable therewith, a plurality of yielding elements arranged in pairs, each pair of the latter having engagement with one of said first named elements, and means for mounting said yielding elements, said mounting means operating to prevent expansion of said yielding elements in any direction other than toward said first named elements.

2. A yielding rotary coupling including rotatably mounted driving and driven members, one member having longitudinally extending transmitting elements, the other member having pairs of recesses facing the first member, and resilient torque transmitting elements mounted in said recesses and adapted to expand only in a direction toward the first named transmitting elements to form a yielding driving connection between said members.

3. A yielding rotary coupling including a driving member and a driven member, means rotatably mounting said members in axial alinement with each other, one member having longitudinally extending transmitting elements, the other member having a pair of recesses facing the first member, and resilient torque transmitting elements mounted in and substantially filling said recesses and adapted to expand only in a direction toward the opposite sides of the first mentioned transmitting elements to form a yielding driving connection between said members.

4. A yielding rotary coupling including a driving member and a driven member, means rotatably mounting said members in axial alinement with each other, one member having a series of transmitting elements extending toward the other member, the other member having a series of pairs of recesses facing the first member, and elastic transmitting blocks mounted in and substantially filling said recesses and adapted to expand only in a direction toward the first mentioned transmitting elements to form yielding driving connections between said members.

5. In a cushion drive for an electric generator, a rotatably mounted driving shaft, an armature shaft, a coupling member rigidly mounted on the driving shaft and provided with a pair of cup-shaped recesses on one face, elastic transmitting blocks mounted in and filling said recesses, and a driven member mounted on said armature shaft and having a cylindrical transmitting element of considerably smaller diameter extending between said blocks and adapted to receive driving torque therefrom as said elastic transmitting blocks tend to envelope said element of smaller diameter and thereby cause relatively wide distribution of the driving torque through said elastic transmitting blocks.

6. In a cushion drive for an electric generator, a rotatably mounted driving shaft, an armature shaft arranged in telescoping relation therewith, a coupling member rigidly mounted on the driving shaft and provided with pairs of cup-shaped recesses on one face thereof having communicating passages between the members of each pair, elastic transmitting cylindrical elements mounted in and substantially filling said recesses, a driven member having transmitting elements adapted to extend into said passages and to be wedged between said cylindrical elements to receive the driving torque therefrom, certain of said cylindrical elements being adapted to prevent back-lash.

7. In a drive of the class described, a driving shaft, a driven shaft, means rotatably mounting said shafts substantially in alignment, a plurality of elements of relatively small diameter drivably associated with one of said shafts and extending toward the other shaft in substantial parallelism therewith, and a cooperating plurality of elastic elements of considerably larger diameter drivably associated with the other of said shafts and adapted to expand toward and register with said elements of smaller diameter to effect flexible driving relation between said shafts.

In testimony whereof I have signed this specification.

EDWARD B. NOWOSIELSKI.